United States Patent
Cheng et al.

(10) Patent No.: US 12,255,366 B2
(45) Date of Patent: Mar. 18, 2025

(54) ENERGY STORAGE SYSTEMS AND AMMONIA-POWERED ELECTRIC VEHICLES INCLUDING THE SAME

(71) Applicant: THE HONG KONG POLYTECHNIC UNIVERSITY, Hong Kong (CN)

(72) Inventors: Ka Wai Eric Cheng, Hong Kong (CN); Molly Meng-Jung Li, Hong Kong (CN); Shu Ping Lau, Hong Kong (CN); Shuangxia Niu, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 313 days.

(21) Appl. No.: 17/932,321

(22) Filed: Sep. 15, 2022

(65) Prior Publication Data
US 2023/0087546 A1   Mar. 23, 2023

Related U.S. Application Data

(60) Provisional application No. 63/261,360, filed on Sep. 20, 2021.

(51) Int. Cl.
*H01M 8/0606* (2016.01)
*B60L 1/00* (2006.01)
(Continued)

(52) U.S. Cl.
CPC .......... *H01M 8/0606* (2013.01); *B60L 1/003* (2013.01); *B60L 50/72* (2019.02); *B60L 53/20* (2019.02);
(Continued)

(58) Field of Classification Search
CPC .......... H01M 8/0606; H01M 8/04007; H01M 8/04738; H01M 8/10; H01M 10/425;
(Continued)

(56) References Cited

U.S. PATENT DOCUMENTS 8,193,764 B2   6/2012   Jakubowski
8,531,153 B2   9/2013   Baarman et al.
(Continued)

FOREIGN PATENT DOCUMENTS

CN   209418658 U   9/2019
CN   210129554 U   3/2020
(Continued)

OTHER PUBLICATIONS

DE-102010006153-A1 English Translation (Year: 2011).*
(Continued)

*Primary Examiner* — James A Shriver, II
*Assistant Examiner* — Michael T. Walsh
(74) *Attorney, Agent, or Firm* — S&F/WEHRW

(57) ABSTRACT

An energy storage system is provided for an electric vehicle. The energy storage system comprises a first energy storage source. The first energy storage source includes an ammonia tank configured to hold ammonia, an ammonia converter configured to receive ammonia from the ammonia tank and convert the received ammonia into hydrogen, and a fuel cell system communicating with the ammonia converter and configured to generate output power from hydrogen that is received from the ammonia converter.

17 Claims, 8 Drawing Sheets

(51) Int. Cl.
 *B60L 50/72* (2019.01)
 *B60L 53/20* (2019.01)
 *H01M 8/04007* (2016.01)
 *H01M 8/04701* (2016.01)
 *H01M 8/10* (2016.01)
 *H01M 10/42* (2006.01)
 *H01M 16/00* (2006.01)

(52) U.S. Cl.
 CPC ... *H01M 8/04007* (2013.01); *H01M 8/04738* (2013.01); *H01M 8/10* (2013.01); *H01M 10/425* (2013.01); *H01M 16/006* (2013.01); *H01M 2010/4271* (2013.01); *H01M 2220/20* (2013.01); *H01M 2250/20* (2013.01)

(58) Field of Classification Search
 CPC ....... H01M 16/006; H01M 2010/4271; H01M 2220/20; H01M 2250/20; H01M 16/003; B60L 1/003; B60L 50/72; B60L 53/20; Y02E 60/50; Y02T 90/40
 See application file for complete search history.

(56) References Cited

U.S. PATENT DOCUMENTS

| | | | | |
|---|---|---|---|---|
| 9,143,000 | B2 | 9/2015 | Leabman et al. | |
| 9,461,320 | B2 * | 10/2016 | Ballantine | H01M 8/04753 |
| 9,673,462 | B2 * | 6/2017 | Skidmore | H01M 8/04298 |
| 11,014,809 | B2 * | 5/2021 | Miura | C01B 3/047 |
| 11,374,246 | B2 * | 6/2022 | Luo | H01M 8/04738 |
| 2011/0236782 | A1 * | 9/2011 | Nagaosa | H01M 8/222 |
| | | | | 429/444 |
| 2014/0356738 | A1 * | 12/2014 | Bell | H01M 8/0662 |
| | | | | 429/411 |
| 2019/0393523 | A1 | 12/2019 | Miura | |
| 2024/0204229 | A1 * | 6/2024 | Sharp | H01M 8/2475 |

FOREIGN PATENT DOCUMENTS

| | | | | |
|---|---|---|---|---|
| CN | 117124905 | A * | 11/2023 | |
| DE | 102010006153 | A1 * | 8/2011 | ............ B64D 27/24 |
| WO | WO-2005053061 | A2 * | 6/2005 | ......... H01M 16/003 |
| WO | 2015067816 | A1 | 5/2015 | |
| WO | WO-2016134565 | A1 * | 9/2016 | ......... B60L 11/1814 |
| WO | 2017165549 | A1 | 9/2017 | |

OTHER PUBLICATIONS

WO-2005053061-A2 English Translation (Year: 2005).*
WO-2016134565-A1 English Translation (Year: 2016).*
T. M. Gur, Review of electrical energy storage technologies, materials and systems: challenges and prospects for large-scale grid storage, Energy Environ. Sci. 2018, 11, 2696-2767.
C. F. Shih, T. Zhang, J. Li, C. Bai, Powering the Future with Liquid Sunshine, Joule 2018, 2, 1925-1949.
A. Klerke, C. H. Christensen, J. K. Nørskov, T. Vegge, Ammonia for hydrogen storage: challenges and opportunities, J. Mater. Chem. 2008, 18, 2304-2310.
G. Thomas, G. Parks, Potential Roles of Ammonia in a Hydrogen Economy a Study of Issues Related to the Use Ammonia for on-Board Vehicular Hydrogen Storage, 2006.
K. E. Lamb, M. D. Dolan, D. F. Kennedy, Ammonia for hydrogen storage; A review of catalytic ammonia decomposition and hydrogen separation and purification, Int. J. Hydrogen Energy 2019, 44, 3580-3593.
D.A.rowl, Y.D.Jo, The hazards and risks of hydrogen, Journal of Loss Prevention in the Process Industries, vol. 20, Iss 2, Mar. 2007, 158-164.
D.W.Kang, S.E.Ju, D.W.Kim, M.Kang, H.Kim and C.S.Hong, Emerging Porous Materials and Their Composites for NH3 Gas Removal, Adv Sci., Jul. 2020, 2002142.

* cited by examiner

ENERGY STORAGE SYSTEMS AND AMMONIA-POWERED ELECTRIC VEHICLES INCLUDING THE SAME

CROSS-REFERENCE TO RELATED APPLICATIONS

This application claims priority to U.S. provisional patent application Ser. No. 63/261,360, filed Sep. 20, 2021, entitled "Carbon-free hydrogen carrier based ammonia powered electric vehicle," hereby incorporated herein by reference as to its entirety.

FIELD OF THE INVENTION

The present invention relates to electric vehicles.

BACKGROUND

Existing electric vehicles (EVs) employ various energy storage systems to supply power, such as gasoline, Li-ion batteries. However, the EVs powered by Li-ion batteries suffer from limited drive range due to factors such as limitations on charging time and positions of the charging station. Currently hybrid electric vehicles (HEVs) are available, which aim to overcome some disadvantages of the Li-ion battery-based EVs. The HEVs typically have diesel engine type of onboard charger, which as a result, however, is undesirable due to gas emission and noise.

New energy storage system designs, methods, etc. for EVs that assist in advancing technological needs and industrial applications in EVs are desirable.

SUMMARY

According to one or more embodiments, an energy storage system is provided for an electric vehicle. The energy storage system comprises a first energy storage source. The first energy storage source includes an ammonia tank configured to hold ammonia, an ammonia converter configured to receive ammonia from the ammonia tank and convert the received ammonia into hydrogen, and a fuel cell system communicating with the ammonia converter and configured to generate output power from hydrogen that is received from the ammonia converter.

Other example embodiments are discussed herein.

BRIEF DESCRIPTION OF THE DRAWINGS

Embodiments of the present inventions are described by way of example with reference to the accompanying figures, which are schematic and not meant to be limiting. For clarity, not every element may be labeled in every figure. The drawings are not necessarily to scale.

DETAILED DESCRIPTION

Figure 1:
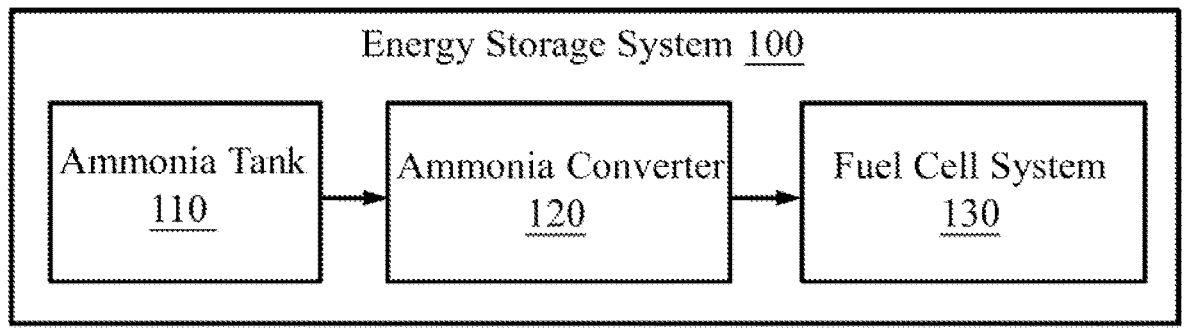
FIG. 1 illustrates an energy storage system according to certain embodiments of the present invention.

Example embodiments relate to energy storage systems and ammonia-powered electric vehicles including the same with improved performance.

In many scenarios, Li-ion batteries or hydrogen fuel cells may be used in electric vehicles. The specific energy of an Li-ion battery is around 140-200 Wh/kg, while the energy density of liquid hydrogen is much larger, which can be around 39 kWh/kg. That is, the hydrogen fuel cell can extend a more traveling distance than the Li-ion battery does at the same weight.

However, as recognized by the present inventors, hydrogen fuel cells possess various issues, such as in aspects of storage, distribution, transportation, operations etc. For example, installation of hydrogen filling stations in densely populated areas and safe handling of hydrogen delivery to the vehicles may not be easily deployed. As another example, hydrogen is flammable when mixed even in small amounts with ordinary air. Therefore, today hydrogen fuel cell vehicle is still not popular in many places. Fire service authorities and transport authorities may have serious concerns about hydrogen tanks in vehicles. Due to the hazardous hydrogen, such vehicles are avoided being used in tunnels, on bridges, or in many other sensitive locations of cities. As a result, the application of hydrogen fuel cell vehicles is significantly limited in many cities.

Example embodiments solve one or more technical problems associated with the existing systems or methods, and provide technical solutions that are unconventional, satisfactory, and favorable for storing or supplying power to electric vehicles.

Example embodiments use ammonia as an energy source to generate power for electric vehicles. According to one or more embodiments, ammonia is firstly cracked into hydrogen ($H_2$) and nitrogen ($N_2$). Hydrogen is then transformed into water or stream through a fuel cell or fuel cells. Electrical energy or electric power is thus generated and to provide main power for an electric vehicle.

One or more such embodiments as described herein provide various technical advantages. For example, ammonia is carbon-free and therefore no carbon dioxide emission will be generated. That is, the process of power generation is clean and does not result in environmental pollution. As another example, there would be no large storage of hydrogen as all the hydrogen is consumed immediately or within a short period of time. Therefore, the hazardous or safety issues caused by hydrogen as described above are mitigated or even avoided.

According to one or more embodiments, as a non-explosive, zero-emission fuel, ammonia produces high volumetric energy density (11.5 MJ/L), higher than 8.5 MJ/L for liquid hydrogen and 4.5 MJ/L for compressed hydrogen at around 700 bars. Further, ammonia has well-established production, transportation, and storage infrastructure, which renders it promising to provide a more practical next-generation power solution to accelerate a "hydrogen society" development. According to one or more embodiments, the use of ammonia, such as liquid ammonia, as fuel with decomposition to $H_2/N_2$ sustains fuel cell power for both automotive and stationary applications without necessity of directly handling hydrogen.

Further, a range extender may be a secondary onboard power generator. Conventionally, an EV range extender is energized by a diesel or gasoline engine. The engine is used to drive the vehicle and the generator. Then the generator charges an onboard battery of the electric vehicle. Such a range extender still results in emission pollution and noise. Moreover, such a hybrid energy conversion system is of low system efficiency.

According to one or more embodiments, the ammonia-based energy storage source acts as an efficient EV range extender to be energized by fuel cell. The fuel cell may directly charge the onboard battery. Compared to the conventional engine range extenders, the ammonia-based fuel cell range extender does not result in emission pollution or noise. According to one or more embodiments, a hybrid energy conversion system including the ammonia-based energy storage source acting as range extender has much higher system efficiency than a conventional hybrid energy system does. Therefore, the ammonia-based range extender according to one or more embodiments as described herein has improved performance, such as improved efficiency, extended drive range, zero-emission, and noise-free pollution.

FIG. 1 illustrates an energy storage system 100 according to certain embodiments of the present invention. The energy storage system 100 can be used with or used for an electric vehicle. The energy storage system 100 can be provided as a part of the electric vehicle or provided separately from and independently on the electric vehicle. For example, the energy storage system 100 may be used to directly power the electric vehicle. Additionally or alternatively, the energy storage system 100 may be used as a range extender to charge an onboard battery of the electric vehicle.

As illustrated, the energy storage system 100 includes an ammonia tank 110, an ammonia converter 120, and a fuel cell system 130. The ammonia tank 110, the ammonia converter 120, and the fuel cell system 130 may be included in a first energy storage source that is a part of the energy storage system 100, or may be considered as constituting a first energy storage source or constituting an essential part of the first energy storage source.

As illustrated, the ammonia tank 110, the ammonia converter 120, and the fuel cell system 130 are connected in series or in cascade, where the arrows indicate direction of flow of materials.

The ammonia tank 110 holds ammonia. The ammonia tank 110 can be a container made of proper materials and suitable for receiving ammonia. By way of example, the ammonia as held is in a liquefied or gas form. The pressure within the ammonia tank 110 is in a range from 1 bar to 10 bars, such as 1 bar, 3 bar, 5 bar, 7 bar, 9 bar, 10 bar, etc.

The ammonia converter 120 communicates with the ammonia tank 110 such that ammonia can be conveyed from the ammonia tank 110 to the ammonia converter 120, where ammonia is converted into hydrogen. For example, under proper conditions within the ammonia converter 120, ammonia can be cracked to generate a mixture including hydrogen, nitrogen, and a small amount of residual ammonia as well.

The fuel cell system 130 communicates with the ammonia converter 120 and receives hydrogen from the ammonia converter 120. The received hydrogen is processed to generate output power or electric power that, for example, can be used to power an electric vehicle. By way of example, the fuel cell system 130 is a proton exchange member (PEM) fuel cell system, despite other kinds of fuel cell system is also possible. By way of example, the fuel cell system 130 can include a single, large fuel cell, or a number of smaller power fuel cell modules connected in series and/or parallel.

Figure 2:
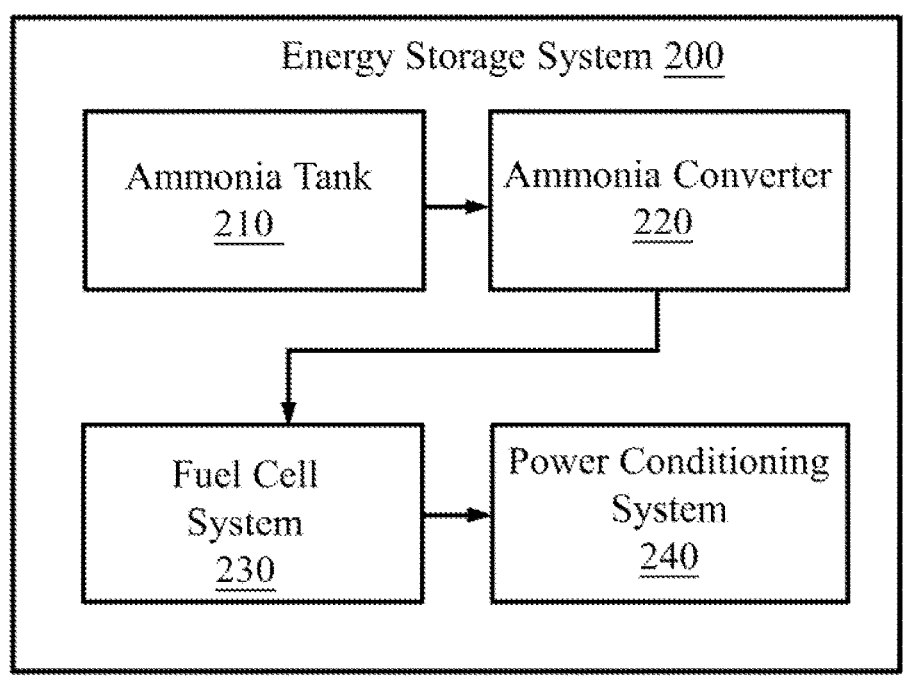
FIG. 2 illustrates an energy storage system according to certain embodiments of the present invention.

FIG. 2 illustrates an energy storage system 200 according to certain embodiments of the present invention.

As illustrated, the energy storage system 200 includes an ammonia tank 210, an ammonia converter 220, and a fuel cell system 230, which, by way of example, can be specific implementations of the ammonia tank 110, the ammonia converter 120, and the fuel cell system 130 respectively with reference to FIG. 1.

Further, the energy storage system 200 includes a power conditioning system 240. The power conditioning system 240 communicates with the fuel cell system 230 and regulates the output power of the fuel cell system 230. By way of example, the power conditioning system 240 includes a unidirectional DC/DC converter that changes output voltage of the fuel cell system 230, thereby changing the output power for use by an electric vehicle (such as by a motor controller of the electric vehicle) or other electronic devices, such as a battery, a supercapacitor, etc.

By way of example, the ammonia tank 210, the ammonia converter 220, the fuel cell system 230, and the power conditioning system 240 may be included in a first energy storage source that is a part of the energy storage system 200, or may be considered as constituting a first energy storage source or constituting an essential part of the first energy storage source.

Figure 3:
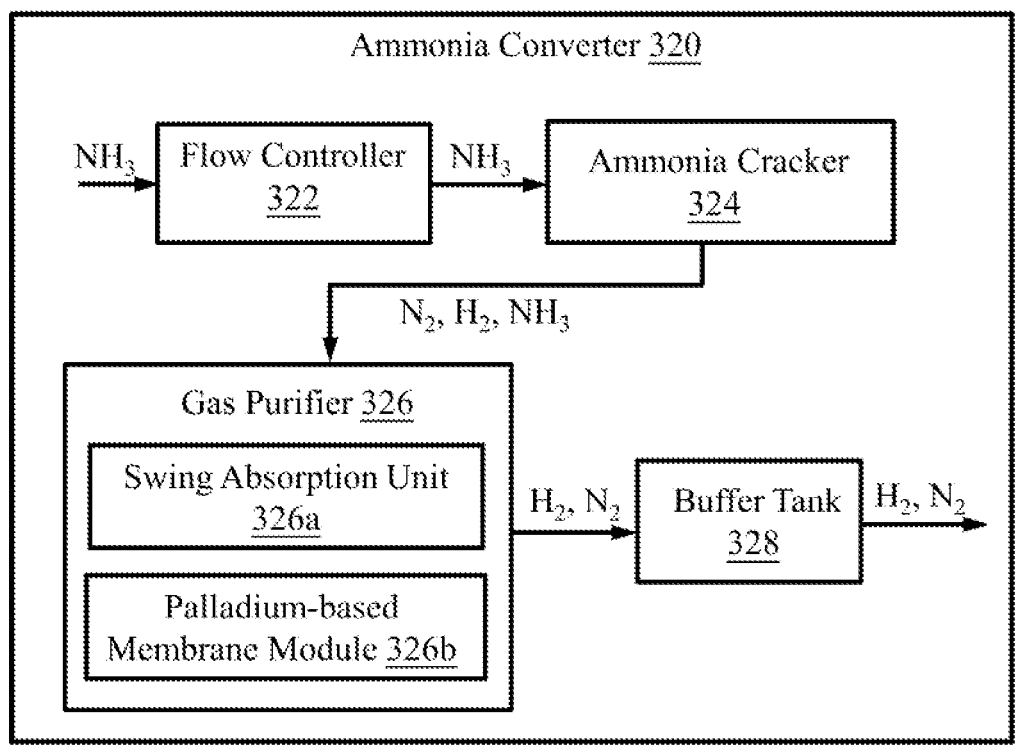
FIG. 3 illustrates an ammonia converter according to certain embodiments of the present invention.

FIG. 3 illustrates an ammonia converter 320 according to certain embodiments of the present invention. The ammonia converter 320 can be a specific implementation of the ammonia converter 120 with reference to FIG. 1 or the ammonia converter 220 with reference to FIG. 2.

As illustrated, the ammonia converter 320 includes a flow controller 322, an ammonia cracker 324, a gas purifier 326, and a buffer tank 328. The flow controller 322 regulates the amount of ammonia flowing into the ammonia converter 320. By way of example, the flow controller 322 includes one or more valves that can be manually operated or automatically adjusted such that ammonia flow (such as speed, amount) can be adjusted.

The ammonia passing through the flow controller 322 enters the ammonia cracker 324, where ammonia is processed or cracked to generate a gas mixture. The gas mixture includes hydrogen, nitrogen and generally a small amount of residual ammonia.

Figure 4:
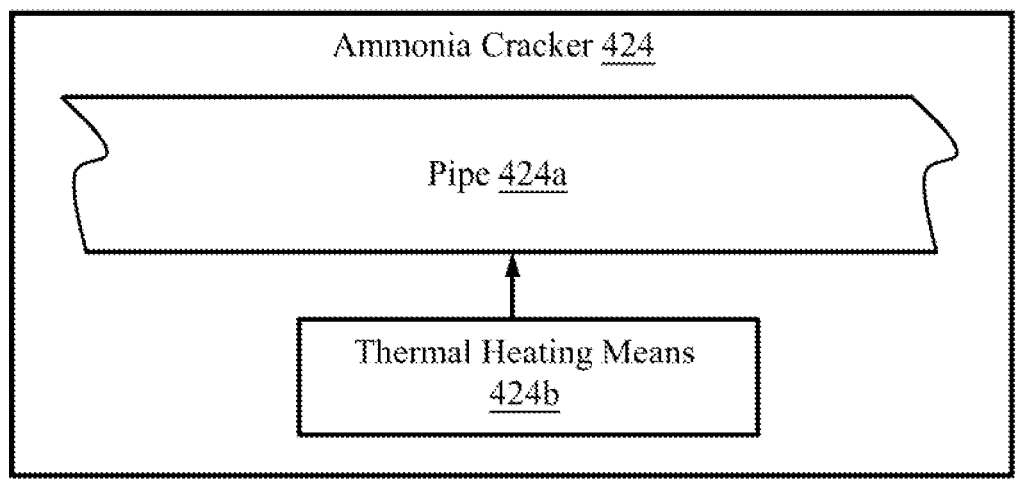
FIG. 4 illustrates an ammonia cracker according to certain embodiments of the present invention.

The ammonia cracker 324 can be configured in a proper manner. One example is illustrated in FIG. 4 where the ammonia cracker 424 can be a specific implementation of the ammonia cracker 324. By way of example, the ammonia cracker 424 is configured as a high-temperature furnace. A pipe 424a is provided in such a manner that ammonia gas can be conducted through. A thermal heating means 424b heats ammonia in the pipe 424a to certain temperature such that ammonia is decomposed or cracked into hydrogen and nitrogen. By way of example, the thermal heating means 424b can be produced by a heating filament or other suitable electrical thermal generator that is driven by electrical voltage. Optionally, to speed up the cracking process, certain catalysts can be provided in proper positions, such as on the inner wall of the pipe 424a, as long as they are physically contactable by ammonia. Various catalysts can be used, such as 13X zeolite, as long as they are able to facilitate chemical reaction of ammonia.

As would be appreciated by those skilled in the art after reading the present disclosure, the operation temperature within the ammonia cracker 424 depends on various factors, such as the catalysts used. The heating time depends on factors, such as specific design of the ammonia cracker 424, size of catalyst bed, and ammonia mass flow rate, etc. In some embodiments, the temperatures ranges from 500° C. to 1100° C., such as from 500° C. to 700° C., from 600° C. to 1000° C., from 800° C. to 1100° C., etc.

With reference to FIG. 3 again, the gas mixture generated in the ammonia cracker 324 is delivered into the gas purifier 326 where residual ammonia is removed from the gas mixture. By way of example, within the gas purifier 326, suitable materials (e.g., zeolite) can be disposed to absorb the residual ammonia, or conduct chemical reaction with the residual ammonia such that the residual ammonia is transformed into other materials, such as solid or liquid materials, thereby detaching from the gas mixture.

After gas purification, the remaining gas mixture including hydrogen and nitrogen enters into the buffer tank 328 and is stabilized. By way of example, the buffer tank 328 can be configured as a container in which suitable chemical materials (e.g., 316 stainless steel) are provided with suitable volume to keep the gas pressure stable when the cracked gas flow changes suddenly.

In some embodiments, the gas purifier 326 includes means for removing nitrogen from the gas mixture. For example, the gas purifier 326 may include a swing absorption unit 326a, which separates nitrogen from the gas mixture under pressure according to the nitrogen molecular characteristics and affinity for certain adsorbent material, or a palladium-based membrane module 326b, which catalyzes the dissociation of hydrogen molecules to hydrogen atoms for diffusing through the membrane to separate hydrogen from the gas mixture. In such embodiments, the production coming from the gas purifier 326 will include at most a small amount of residual nitrogen. It should be appreciated that, however, the swing absorption unit 326a or the palladium-based membrane module 326b is optional and not utilized in some embodiments.

Figure 5:
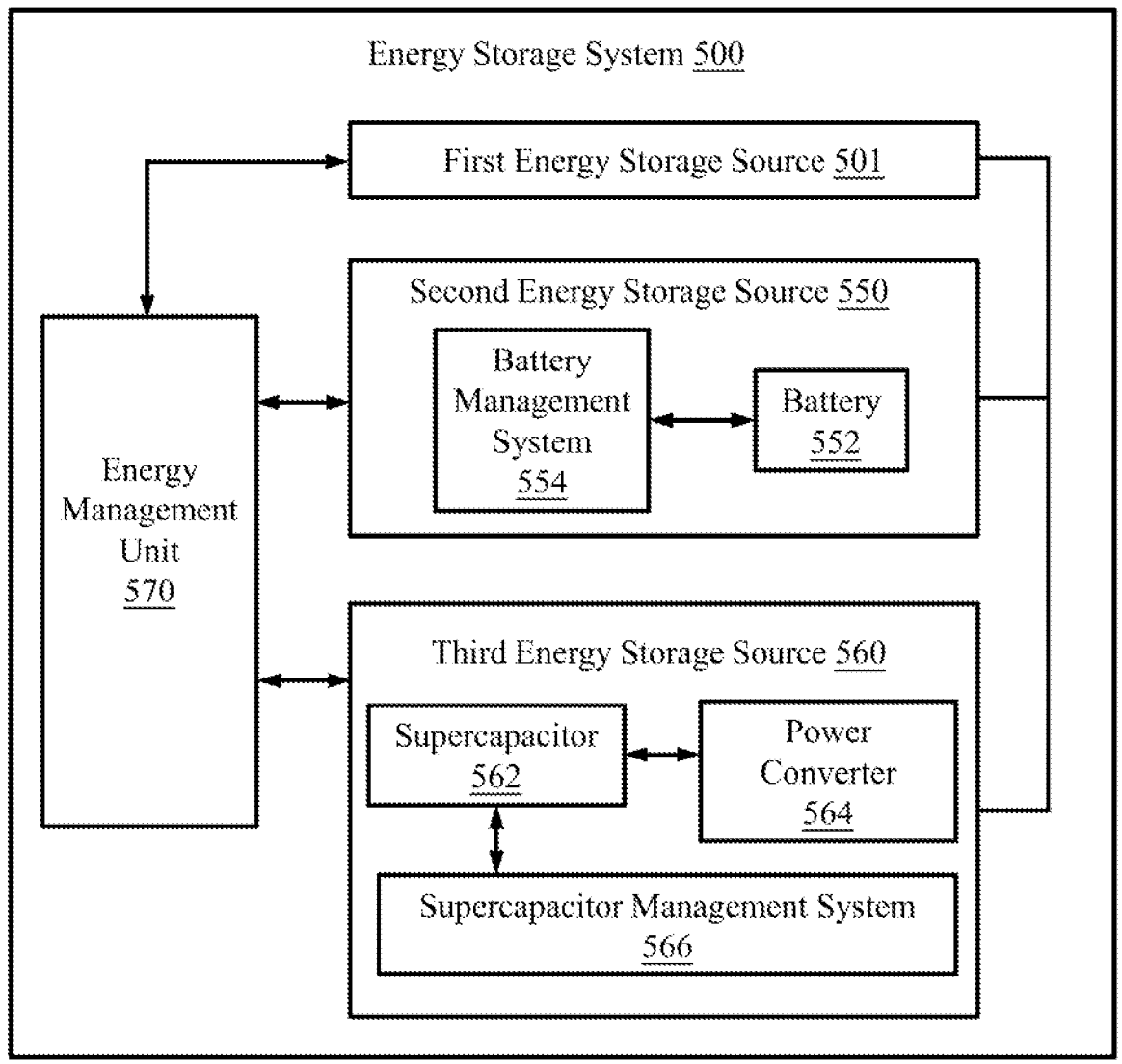
FIG. 5 illustrates an energy storage system according to certain embodiments of the present invention.

FIG. 5 illustrates an energy storage system 500 according to certain embodiments of the present invention. The energy storage system 500 can be used with an electric vehicle. The energy storage system 500, for example, can be a specific implementation of the energy storage system 100 or the energy storage system 200 as described above.

As illustrated, the energy storage system 500 includes a first energy storage source 501, a second energy storage source 550, and a third energy storage source 560. The first energy storage source 501 is ammonia-based, and for example, can be the first energy storage source as described with reference to one or more figures above. The first energy storage source 501 generates hydrogen from ammonia source and then transforms hydrogen by using fuel cell into electric power that is used by an electric vehicle or other electronic devices.

The second energy storage source 550 includes a battery 552. The battery 552 stores or releases electrical energy. The battery 552 can be an onboard battery of an electric vehicle and supplies power to the electric vehicle. By way of example, the second energy storage source 550 communicates with the first energy storage source 501 so as to receive power from the first energy storage source 501, such as through a power conditioning system of the first energy storage source 501.

The battery 552 can take various forms. By way of example, the battery 552 can be an electrochemical battery. The battery 552 can be a Li-ion based battery, a Li-based battery, a Nickel-Cadmium battery, a Nickel metal hydride-based battery, a lead-acid battery, or the like, or combination thereof. By way of example, the battery 552 can include a number of cells connected in series or parallel to meet certain energy storage requirement. The battery 552 can be a single battery pack, or include two or more battery packs connected in series or parallel according to practical needs.

In some embodiments, optionally, the second energy storage source 550 includes a battery management system 554. The battery management system 554 monitors operation of the battery 552. For example, the battery management system 554 collects various battery parameters such as voltage, current, state of charge (SOC), temperature, etc. for facilitating operations of the battery 552.

The third energy storage source 560 can connect with the second energy storage source 550 in a suitable manner. As illustrated, the third energy storage source 560 connects in parallel with the second energy storage source 550. The third energy storage source 560 includes a supercapacitor 562. The supercapacitor 562 stores or releases electrical energy. The supercapacitor 562 can be a single supercapacitor. In some embodiments, the supercapacitor 562 includes two or more supercapacitors connected in series or parallel according to practical needs. In some embodiments, the supercapacitor 562 connects with the battery 552 directly in parallel.

Optionally, the third energy storage source 560 includes a power converter 564. By way of example, the power converter 564 is connected in series with the supercapacitor 562. The power converter 564, for example, can be disposed between the supercapacitor 562 and the battery 552 such that the supercapacitor 562 is connected in parallel with the battery 552 indirectly through the power converter 564. The power converter 564 performs voltage conversion between the voltage of the supercapacitor 562 and the voltage of the battery 552. For example, the power converter 564 converts supercapacitor voltage to battery voltage, or converts the battery voltage to the supercapacitor voltage. In this way, the power converter 564 acts as a bidirectional power flow control. For example, the low-voltage side of the power converter 564 can be connected to the supercapacitor 562 and the high-voltage side of the power converter 564 can be connected in parallel to the battery 552.

Optionally, in some embodiments, the third energy storage source 560 includes a supercapacitor management system 566. The supercapacitor management system 566 monitors the operation of the supercapacitor 562. For example, the supercapacitor management system 566 collects various supercapacitor parameters such as voltage, current, state of energy, temperature, etc. for facilitating operations of the supercapacitor 562.

Optionally, in some embodiments, the energy storage system 500 includes an energy management unit 570 that communicates with the first energy storage source 501, the second energy storage source 550, and the third energy storage source 560 such that one or more parameters related to one or more of the three energy storage sources are regulated. For example, the energy management unit 570 monitors or regulates parameters such as gas flow parameters (e.g., gas composition, flow speed, or the like), and electrical parameters and environmental parameters so as to enable an electric vehicle to operate in improved or optimized condition. For example, the energy storage system 500 collects information on the measured flow rate, the temperature of ammonia cracker, input voltage and input current of a motor controller, battery voltage, battery current, battery's state of charge, supercapacitor voltage, supercapacitor current, supercapacitor's state of energy, voltage and current of a power conditioning system, voltage and current of a power converter. The energy storage system 500 can control power at the high-voltage side of the power conditioning system, as well as power of the power converter.

The energy management unit 570 can be implemented as electric circuits including a combination of electrical hardware and software. Energy management strategy can be embedded in the energy management unit 570 to implement improved or optimal ammonia and hydrogen fuel economy. Further, in some embodiments, at least a part of the energy management unit 570 is programable such that software can be programmed and written into the energy management unit 570. In some other embodiments, the energy management unit 570 is implemented as an artificial intelligence machine that can be trained, learning, perceiving environment, and taking actions to optimize the management of system intelligently.

As illustrated in FIG. 5, the battery management system 554, the supercapacitor management system 566, and the energy management unit 570 are implemented as separate units. This configuration is optional. In some embodiments, the battery management system 554, or the supercapacitor management system 566, or both can be implemented as a part of the energy management unit 570.

Further, the three energy storage sources 501, 550, and 560 constitute a hybrid energy conversion system. This is beneficial. For example, when used with an electric vehicle, the battery 552 or the supercapacitor 562 is capable of absorbing braking energy. The battery 552 and the supercapacitor 562 also improve the dynamic performance of the electric vehicle.

Figure 6:
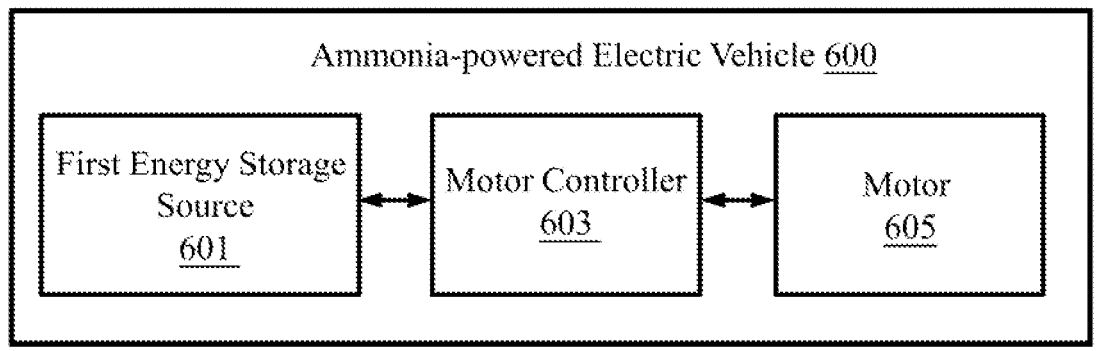
FIG. 6 illustrates an ammonia-powered electric vehicle according to certain embodiments of the present invention.

FIG. 6 illustrates an ammonia-powered electric vehicle 600 according to certain embodiments of the present invention. The electric vehicle 600 is a vehicle that uses one or more electric motors for propulsion. The electric vehicle 600, for example, may be an electric car, an electric golf cart, or the like. The electric vehicle 600 is powered by ammonia and possesses various advantages over prior art electric vehicle systems, such as improved safety and range extender, reduced noise and emission, etc.

As illustrated, the electric vehicle 600 includes a first energy storage source 601, a motor controller 603, and a motor 605 that are connected in cascade. The first energy storage source 601 can be a specific implementation of the first energy storage source as described above with one or more figures. The first energy storage source 601 uses an ammonia source to generate hydrogen that is subsequently transformed into electric power via one or more fuel cells.

The first energy storage source 601 outputs electric power to the motor controller 603. The motor controller 603 regulates the output power to generate regulated output power and conveys the regulated output power to the motor 605. For example, the motor controller 603 converts the electrical voltage into electrical power voltage suitable for consumption by the motor 605. The motor controller 603 determines current fed to the motor 605 and controls motor speed. The motor controller 603 can include a motor driver or a power inverter that includes power devices such as Metal-Oxide-Semiconductor Field-Effect Transistors (MOSFETs) or Insulated Gate Bipolar Transistors (IGBTs) to generate electrical signals. The signals can be pulse-width modulated.

Figure 7:
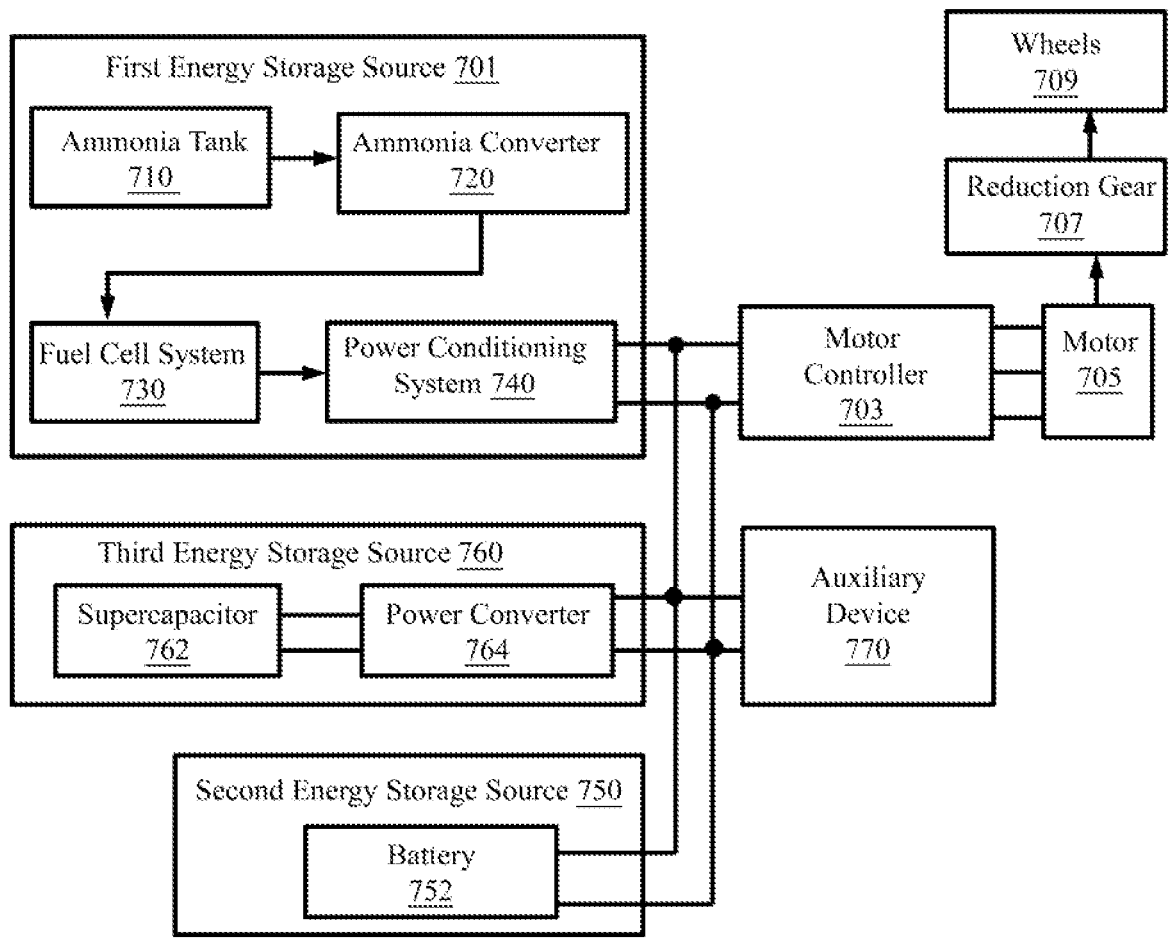
FIG. 7 illustrates an ammonia-powered electric vehicle according to certain embodiments of the present invention.

FIG. 7 illustrates an ammonia-powered electric vehicle according to certain embodiments of the present invention. The ammonia-powered electric vehicle, for example, can be a specific implementation of the electric vehicle 600 with reference to FIG. 6.

As illustrated, the electric vehicle includes a first energy storage source 701, a second energy storage source 750, a third energy storage source 760, a motor controller 703, a motor 705, a reduction gear 707, wheels 709, an auxiliary device 770.

The first energy storage source 701, for example, can be a specific implementation of the first energy storage source as described above with reference to one or more figures. The first energy storage source 701 includes an ammonia tank 710, an ammonia converter 720, a fuel cell system 730, and a power conditioning system 740, which are connected in a cascade.

The second energy storage source 750, for example, can be a specific implementation of the second energy storage source as described above with reference to one or more figures. The second energy storage source 750 includes a battery 752. The third energy storage source 760, for example, can be a specific implementation of the third energy storage source as described above with reference to one or more figures. The third energy storage source 760 includes a supercapacitor 762 and a power converter 764 connected in parallel with the supercapacitor 762.

The first, second, and third energy storage sources 701, 750, 760 are connected in parallel with each other, and the output of each energy storage source is connected to the motor controller 703 that delivers power to the motor 705. The motor 705 converts electrical energy to mechanical energy, or converts mechanical energy to electrical energy. The motor 705 drives the wheels 709 of the electric vehicle via the reduction gear 707, or through other types of mechanical transmission or subsystem.

The auxiliary device 770 communicates with the first energy storage source 701, the second energy storage source 750, and the third energy storage source 760 such that the auxiliary device 770 is powered by at least one of the three energy storage sources. The auxiliary device 770 can include one or more electrical devices, such as one or more air-conditioners, one or more fans, etc.

By way of example, via the power conditioning system 740, the fuel cell system 730 provides controllable electric power to the motor controller 703 and the auxiliary device 770. In some embodiments, the battery 752 directly provides electric power to the motor controller 703 and the auxiliary device 770. In some embodiments, via the power converter 764, the supercapacitor 762 provides controllable electric power to the motor controller 703 and the auxiliary device 770. In some embodiments, via the power conditioning system 740, the fuel cell system 730 provides controllable electric power to the battery 752 or the supercapacitor 762.

By way of example, the motor controller 703 converts braking energy of the electric vehicle into electrical energy or electric energy that is to be fed back to the battery 752, or to the supercapacitor 762 via the power converter 764, or to both. The motor controller 703 can adjust the barking energy according to practical needs. In some embodiments, via the motor 703 and the motor controller 705, the battery 752 directly absorbs the braking energy. In some embodiments, via the power converter 764, the motor 703, and the motor controller 705, the supercapacitor 762 absorbs the braking energy. In some embodiments, the second energy storage source 750, or the third energy storage source 760, or both, absorbs the energy provided by the first energy storage source 701.

In some embodiments, through controlling the output power of the fuel cell system 730 and the supercapacitor 762, the output power of the battery 752 can be regulated indirectly.

In some embodiment, by way of example, the mechanical shaft power of an electric vehicle can be expressed as $$P_{sh} = v\left(m\frac{dv}{dt} + \frac{1}{2}D_a A C_d v^2 + C_r mg + mg\sin\theta\right) \quad (1)$$

where m represents the mass of the electric vehicle, v represents vehicle velocity, t represents time, $D_a$ represents density of the air, A represents the front area of the electric vehicle, $C_d$ represents drag coefficient, $C_r$ represents coefficient of the rolling resistance, g is the acceleration due to gravity, and $\theta$ is the angle of a slope.

The input power of the motor is equal to the output power of the motor controller, and can be expressed as $$P_m = \frac{P_{sh}}{\eta_{gk}\eta_{mk}} \quad (2)$$

$$\eta_{gk} = \begin{cases} \eta_g & \text{(under driving)} \\ \frac{1}{\eta_g} & \text{(under braking)} \end{cases} \quad (3)$$

$$\eta_{mk} = \begin{cases} \eta_m & \text{(under driving)} \\ \frac{1}{\eta_m} & \text{(under braking)} \end{cases} \quad (4)$$

where $\eta_g$ represents efficiency of the reduction gear, and $\eta_m$ represents efficiency of the motor. Hence, the input power of the motor controller is computed as $$P_{mc} = \frac{P_m}{\eta_{mck}} \quad (5)$$

$$\eta_{mck} = \begin{cases} \eta_{mc} & \text{(under driving)} \\ \frac{1}{\eta_{mc}} & \text{(under braking)} \end{cases} \quad (6)$$

where $\eta_{mc}$ represents the efficiency of the motor controller. There is a balanced relationship between the output power of the power conditioning system, output power of the battery, output power of the super-capacitor power converter, the input power of the motor controller, and the input power of the auxiliary device, which can be given as $$P_{pcs} + P_b + P_{scpc} - P_{mc} - P_{ad} = 0 \quad (7)$$

Furthermore, the output power of the fuel cell system (such as a PEM fuel cell system) is equal to the input power of the power conditioning system, and can be expressed as $$P_{fc} = \frac{P_{pcs}}{\eta_{pcs}}, \quad (8)$$

where $\eta_{pcs}$ represents the efficiency of the power conditioning system. The output power of the fuel cell system can be also expressed as $$P_{fc} = i_{fc} u_{fc}, \quad (9)$$

where $i_{fc}$ is the output current of the fuel cell system and $u_{fc}$ is the output voltage of the fuel cell system. To provide the output power of the fuel cell system shown in (8)-(9), the hydrogen consumption of the fuel cell system is required, and expressed as $$m_{H_2} = \int_0^{T_{fc}} \frac{NM_{H_2}}{2F} i_{fc} dt, \quad (10)$$

where $t_{fc}$ represents operating time, n is the number of cells in the fuel cell system, $M_{H2}$ is the molar mass of hydrogen, and f is the faraday constant. The aforementioned hydrogen consumption comes from the ammonia converter. Thus, the ammonia consumption provided by the ammonia tank can be given as $$m_{NH_3} = \int_0^{T_{fc}} k_{con} \frac{17 NM_{H_2}}{6F} i_{fc} dt. \quad (11)$$

where $k_{con}$ is the conversion coefficient of the ammonia converter and is larger than 1. The equations (1)-(11) above show that the specified shaft power is applied to the wheels to drive the electric vehicle to move at the specified velocity if a specified amount of ammonia is input to the ammonia converter.

Assuming that the rated energy of the battery is $W_{br}$ that is used to drive the electric vehicle for obtaining the rated travelling range $R_{tr}$, and the extended travelling range is $R_e$, the total travelling range of the electric vehicle is given as $$R_{tt} = R_{tr} + R_e \quad (12)$$

The energy required by the extended range is estimated as $$W_{re} = W_{br}\frac{R_e}{R_{tr}} \quad (13)$$

The energy provided by the fuel cell pack is estimated as $$W_{fcp} = \frac{W_{re}}{\eta_{pcs}} \quad (14)$$

where $\eta_{pcs}$ is the efficiency of the power conditioning system of the fuel cell system. Supposing that the rated capacity of the fuel cell module is $C_{fcm}$, the rated voltage of the fuel cell module is $V_{fcm}$, the rated energy of the fuel cell module is calculated as $$W_{fcm} = C_{fcm} V_{fcm} \quad (15)$$

Thus, the number of the fuel cell modules is estimated as $$N_{fcm} = \frac{W_{fcp}}{W_{fcm}} \quad (16)$$

It can be seen that the fuel cell pack consists of $N_{fcm}$ fuel cell modules. Thus, the amount of the ammonia consumption can be calculated or estimated by the above power equations.

Figure 8A:
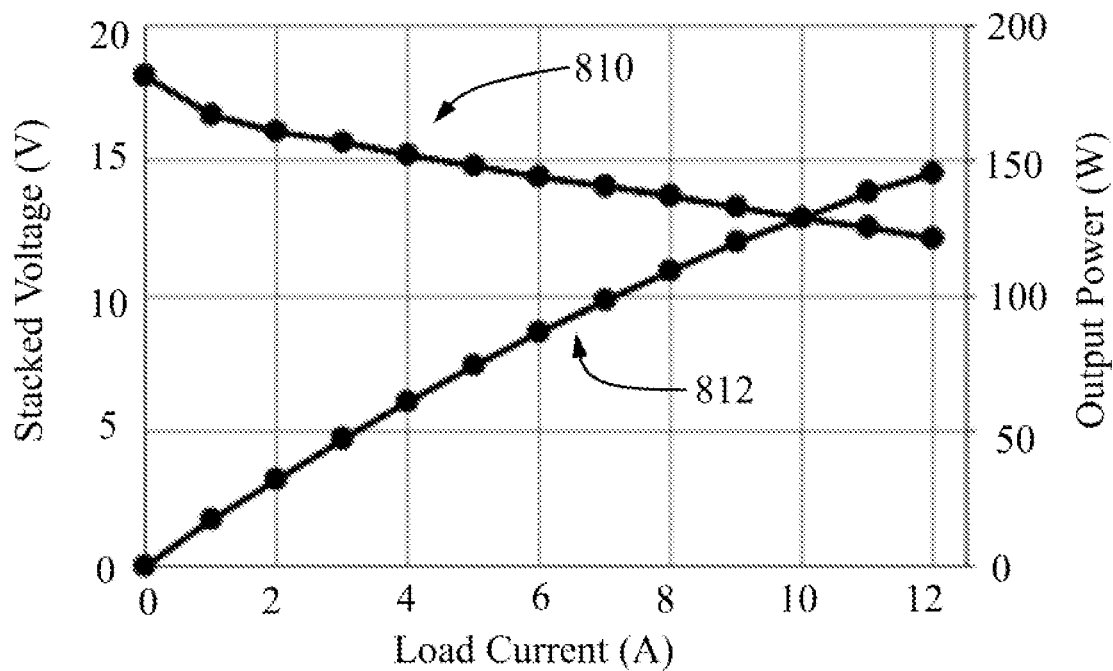
FIG. 8A illustrates a fuel cell testing result with 75% $H_2$ according to certain embodiments of the present invention.
Figure 8B:
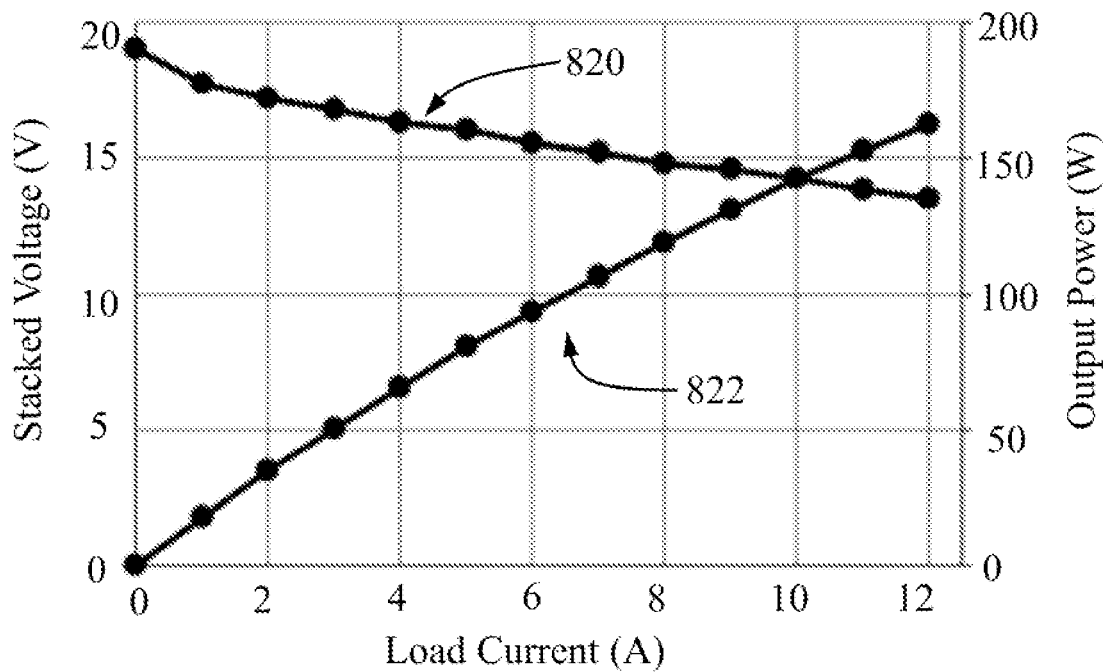
FIG. 8B illustrates a fuel cell testing result with cracked $NH_3$ gas mixture at 700° C., >99% conversion, purified by a catalyst called 13X zeolite according to certain embodiments of the present invention.

FIG. 8A illustrates a fuel cell testing result with 75% $H_2$ according to certain embodiments of the present invention. FIG. 8B illustrates a fuel cell testing result with cracked $NH_3$ gas mixture at 700° C., >99% conversion, purified by a catalyst called 13X zeolite according to certain embodiments of the present invention. The horizontal axis represents load current, which is the output current of the PEM fuel cell system. Curves 810 and 820 represent stacked voltage, which is the output voltage of the PEM fuel cell system. Curves 812 and 822 represent output power, which is the output power of the PEM fuel cell system.

As demonstrated, the electrical performance of the PEM fuel cell with the input of 75% hydrogen and 25% nitrogen is approximately the same as the one with input of hybrid gas. Thereby, it is indicated that the hybrid gas output by the ammonia converter consists approximately of 75% hydrogen and 25% nitrogen. That is, the fuel cell testing results confirm that the fuel cells can achieve comparable performance and power output under flow-through operation mode for both synthetic 75% $H_2$/25% $N_2$ and the cracked gas mixture (consisting of approximately 75% hydrogen and 25% of nitrogen) according to certain embodiments.

Figure 9:
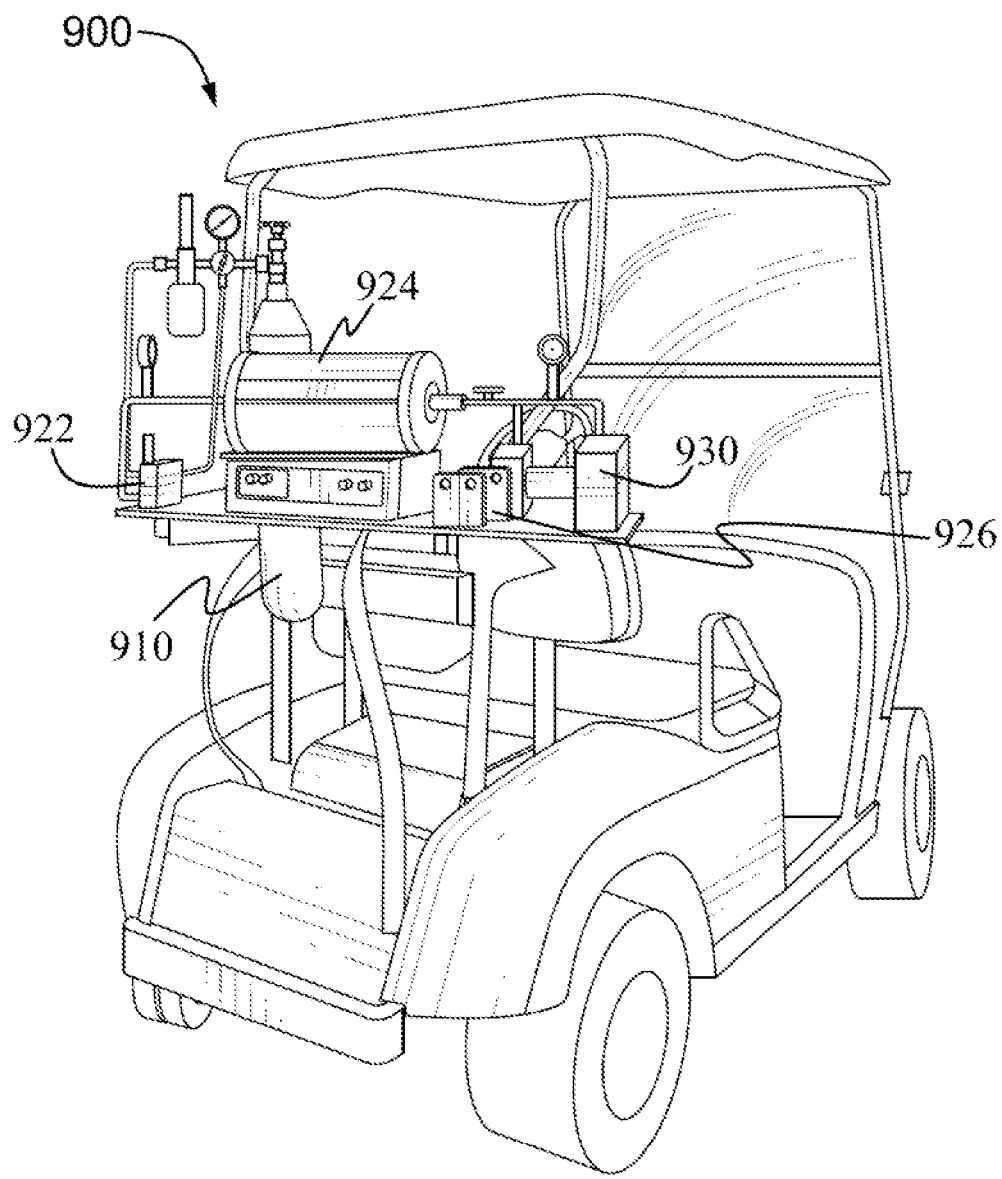
FIG. 9 illustrates an ammonia-powered electric vehicle according to certain embodiments of the present invention.

FIG. 9 illustrates an ammonia-powered electric vehicle 900 according to certain embodiments of the present invention. The electric vehicle 900, for example, can be a specific implementation of the electric vehicles as described above with reference to one or more figures. The electric vehicle 900 as illustrated, is a light vehicle or called an electric golf cart.

The electric vehicle 900 is powered by ammonia. As can be seen, the electric vehicle 900 is provided with an ammonia tank 910, a flow controller 922, an ammonia cracker 924, a gas purifier 926, and a PEM fuel cell 930. Other components, such as the battery, supercapacitor, etc. are not indicated in FIG. 9.

Figure 10:
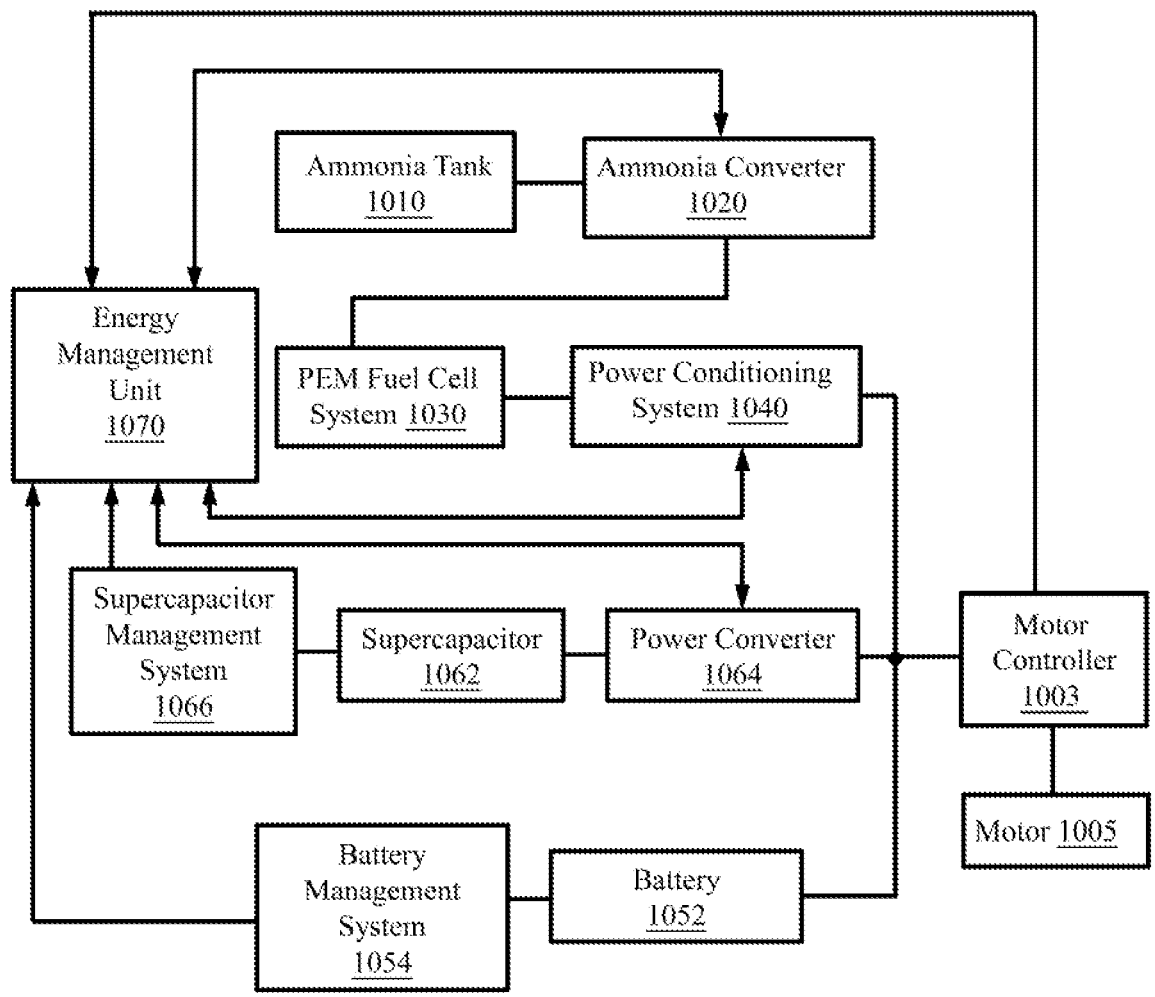
FIG. 10 illustrates an energy management system according to certain embodiments of the present invention.

FIG. 10 illustrates an energy management system according to certain embodiments of the present invention. The energy management system can be used with an electric vehicle or be a part of the electric vehicle. The energy management system may be broadly understood as including one or more energy storage resources and/or other electrical components as described above with reference to one or more figures. In some embodiments, the energy management system may be implemented as a distributed system that includes various electric circuits facilitating signal flow or data exchange.

The energy management system collects various parameters (such as parameters related to electrical components, or environmental parameters), monitors conditions (such as whether over-current or over-temperature occurs), and facilitates the operation of part or whole of the electric vehicle.

As illustrated, FIG. 10 shows an ammonia tank 1010, an ammonia converter 1020, a PEM fuel cell system 1030, a power conditioning system 1040, a battery 1052, a battery management system 1054, a supercapacitor 1062, a power converter 1064, a supercapacitor management system 1066, a motor controller 1003, a motor 1005, and an energy management unit 1070.

Hybridization of the ammonia-powered PEM fuel cell system 1030 with other energy storage devices such as battery 1052 and/or supercapacitor 1062 can improve dynamics and power density. Such hybridization allows the ammonia-powered PEM fuel cell system 1030 to be optimized to achieve improved fuel economy (such as low fuel consumption, high battery efficiency and high super-capacitor efficiency, etc.) and performance as a part of the load is provided by the battery 1052 and/or the supercapacitor 1062. The energy management unit 1070 can coordinate various energy storage resources, such as distributing load power among these energy sources, thereby improving fuel economy while ensuring that each energy source operates within its limits.

For example, acquiring battery voltage, current, state of charge and fault information via the battery management system 1054, the supercapacitor voltage, current, state of energy and fault information via the supercapacitor management system 1066, the input voltage, current of the motor controller 1003, the flow rate of the ammonia, and the temperature of the ammonia cracker, the energy management unit 1070 executes predefined energy management strategy, controls the flow rate of the ammonia, temperature of the cracker, the power conditioning system 1040 and the power converter 1020, and distributes load power among three energy storage sources for implementing improved or optimized fuel economy.

In some embodiments, the supercapacitor management system 1066 and/or the battery management system 1054 can be implemented as a part of the energy management unit 1070.

Figure 11:
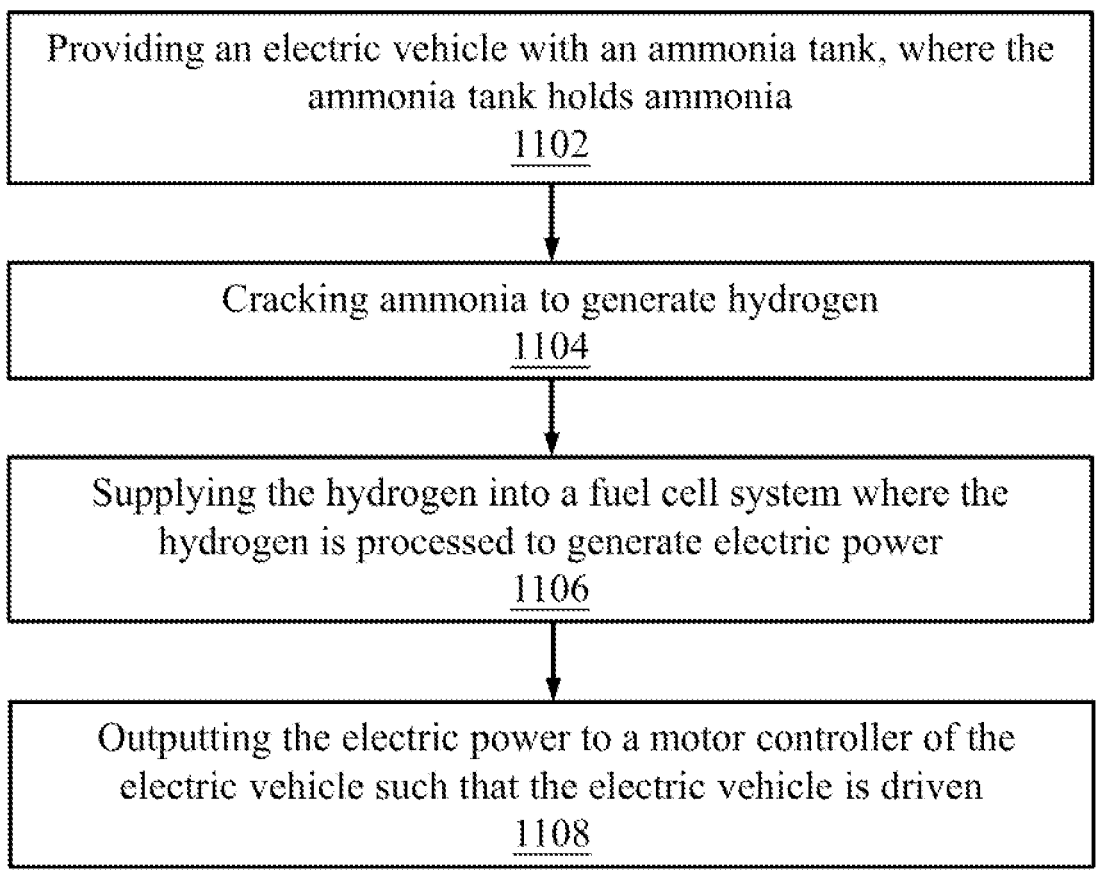
FIG. 11 illustrates a method of providing power to an electric vehicle according to certain embodiments of the present invention.

FIG. 11 illustrates a method of providing ammonia-based power to an electric vehicle according to certain embodiments of the present invention. The method can be used to facilitate operation (such as driving, charging, etc.) for the electric vehicle, or for one or more electrical components of the electric vehicle, such as one or more auxiliary devices.

Block 1102 states providing an electric vehicle with an ammonia tank, where the ammonia tank holds ammonia. The ammonia tank can be a proper container installed on or attached to the electric vehicle. The ammonia can be in a suitable form, such as in the form of liquid or gas.

Block 1104 states cracking ammonia to generate hydrogen. By way of example, ammonia is conveyed, under certain conditions, such as with proper flow control, from the ammonia tank to an ammonia cracker where ammonia is decomposed into hydrogen and nitrogen. The conditions suitable for ammonia cracking can be designed according to practical needs, such as the design of the cracker, the catalyst used, the gas flow, etc.

Block 1106 states supplying the hydrogen into a fuel cell system where the hydrogen is processed to generate electric power. The fuel cell system can be a PEM fuel cell system or other types of the fuel cell system. The PEM fuel cell system can include various numbers of cells or modules depending on factors such as hydrogen consumption.

Block 1108 states outputting the electric power to a motor controller of the electric vehicle such that the electric vehicle is driven. In some embodiments, the electric power coming from the fuel cell system is regulated via a power conditioning system before inputting into the motor control.

In some embodiments, the output power is used to charge one or more onboard batteries of the electric vehicle. In some embodiments, the output power is used to charge one or more supercapacitors disposed on the electric vehicle. In some embodiments, the output power is used to power one or more auxiliary devices, such as air-conditioners, fans, etc. disposed on the electric vehicle.

As used herein, the term "connect" or "connected" means physically connected or electrically connected, such that materials can be transported physically, or signals or data can be transmitted electrically.

As used herein, the term "controllable electric power" means the electric power can be controlled. For example, the current, the voltage, or both may be adjusted, thereby rendering the electric power adjustable.

Unless otherwise defined, the technical and scientific terms used herein have plain meanings as commonly understood by those skilled in the art to which the example embodiments pertain. Embodiments are illustrated in non-limiting examples. Based on the above disclosed embodiments, various modifications that may be conceived of by those skilled in the art would fall within the scope of the example embodiments.

What is claimed is:

1. An energy storage system for an electric vehicle, the energy storage system comprising a first energy storage source that includes:
an ammonia tank configured to hold ammonia;
an ammonia converter configured to receive ammonia from the ammonia tank and convert the received ammonia into hydrogen; and
a fuel cell system communicating with the ammonia converter and configured to generate output power from hydrogen that is received from the ammonia converter,
where the first energy storage source further includes a power conditioning system that communicates with the fuel cell system and regulates the output power of the fuel cell system,
wherein the energy storage system further comprises:
a second energy storage source, the second energy storage source including a battery; and
a third energy storage source, the third energy storage source including a supercapacitor, the supercapacitor being connected with the battery in parallel,
wherein the fuel cell system is configured to provide controllable electric power to the battery or the supercapacitor via the power conditioning system.

2. The energy storage system of claim 1, wherein the ammonia tank is configured to hold the ammonia in liquefied or gas form, and a pressure within the ammonia tank is in a range from 1 bar to 10 bars.

3. The energy storage system of claim 1, wherein the fuel cell system is a proton exchange member (PEM) fuel cell system.

4. The energy storage system of claim 1, wherein the ammonia converter includes:
a flow controller communicating with the ammonia tank and configured to control flow of ammonia from the ammonia tank into the ammonia converter;
an ammonia cracker configured to receive ammonia from the flow controller and crack the received ammonia into a gas mixture including hydrogen and nitrogen;
a gas purifier configured to remove residual ammonia from the gas mixture that is received from the ammonia cracker; and
a buffer tank configured to stabilize the gas mixture received from the gas purifier.

5. The energy storage system of claim 1, wherein the gas purifier includes means for removing nitrogen from the gas mixture.

6. The energy storage system of claim 1, wherein the ammonia cracker includes:
thermal heating means configured to control temperature within the ammonia cracker;
a pipe configured to conduct ammonia from the flow controller to the ammonia converter; and
a catalyst in contact with the ammonia and configured to facilitate reaction of cracking the ammonia.

7. The energy storage system of claim 1, further comprising a power converter connected in series with the supercapacitor and configured to perform voltage conversion between voltage of the supercapacitor and voltage of the battery.

8. The energy storage system of claim 1, further comprising an energy management unit configured to regulate one or more parameters related to at least one of the first energy storage source, the second energy storage source, and the third energy storage source.

9. An ammonia-powered electric vehicle comprising:
a first energy storage source that includes an ammonia tank configured to hold ammonia, an ammonia converter configured to convert ammonia that is received from the ammonia tank into hydrogen, a fuel cell system configured to generate output power from hydrogen that is received from the ammonia converter, and a power conditioning system configured to regulate the output power of the fuel cell system;
a motor controller configured to receive the output power of the fuel cell system and regulate the output power to generate regulated output power;
a motor configured to receive the regulated output power from the motor controller such that the ammonia-powered electric vehicle is driven by the regulated output power,
a second energy storage source, the second energy storage source including a battery connected in parallel with the power conditioning system; and
a third energy storage source, the third energy storage source including a supercapacitor, the supercapacitor being connected in parallel with the battery.

10. The ammonia-powered electric vehicle of claim 9, further comprising:
an auxiliary device communicating with the first energy storage source, the second energy storage source, and the third energy storage source such that the auxiliary device is powered by at least one of the first energy storage source, the second energy storage source, and the third energy storage source.

11. The ammonia-powered electric vehicle of claim 10, wherein the auxiliary device includes at least one of an air-conditioner and a fan, and the battery is configured to provide electric power to the motor controller and the auxiliary device.

12. The ammonia-powered electric vehicle of claim 10, wherein the auxiliary device includes at least one of an air-conditioner and a fan, and the supercapacitor is configured to provide electric power to the motor controller and the auxiliary device.

13. The ammonia-powered electric vehicle of claim 9, wherein the third energy storage source includes a power converter disposed between the supercapacitor and the motor controller and configured to regulate electric power provided by the supercapacitor to the motor controller.

14. An ammonia-powered electric vehicle comprising:
a first energy storage source that includes an ammonia tank configured to hold ammonia, an ammonia converter configured to convert ammonia that is received from the ammonia tank into hydrogen, a proton exchange member (PEM) fuel cell system configured to generate output power from hydrogen that is received from the ammonia converter, and a power conditioning system configured to regulate the output power of the PEM fuel cell system;
a motor controller configured to receive the output power from the power conditioning system and regulate the output power to generate regulated output power;
a motor configured to receive the regulated output power from the motor controller such that the ammonia-powered electric vehicle is driven by the regulated output power;
a second energy storage source including a battery configured to provide power to the motor controller; and
a third energy storage source being connected with the battery in parallel, the third energy storage source including a supercapacitor and a power converter, the power converter regulating power outputted from the supercapacitor to the motor controller.

15. The ammonia-powered electric vehicle of claim 14, wherein at least one of the second energy storage source and the third energy storage source is configured to perform (a), or (b), or both:
(a) absorb braking energy of the ammonia-powered electric vehicle via the motor controller; and
(b) absorb energy provided by the first energy storage source.

16. The ammonia-powered electric vehicle of claim 14, wherein the ammonia converter includes:
a flow controller configured to receive ammonia from the ammonia tank and control flow of the ammonia;
an ammonia cracker configured to crack ammonia that is received from the ammonia converter into a gas mixture including hydrogen and nitrogen;
a gas purifier configured to remove residual ammonia from the gas mixture that is received from the ammonia cracker, the gas purifier including means for removing nitrogen from the gas mixture; and
a buffer tank configured to stabilize the gas mixture received from the gas purifier.

17. The ammonia-powered electric vehicle of claim 14, further comprising an energy management unit configured to regulate one or more parameters related to at least one of the first energy storage source, the second energy storage source, and the third energy storage source, wherein the energy management unit includes a battery management system configured to monitor operation of the battery and a supercapacitor management system configured to monitor operation of the supercapacitor.

* * * * *